United States Patent
Umeya et al.

[15] 3,663,248
[45] May 16, 1972

[54] SINTERED CERAMIC BODY CONTAINING RESIDUAL CARBON, AND PROCESS FOR PREPARING IT

[72] Inventors: Kaoru Umeya, Sendai-shi; Shunji Tanaka, Ilayama; Shinpei Gomi, Tokyo, all of Japan

[73] Assignees: Kureha Kagaku Kogyo Kabushiki Kaisha; Kyushu Taika Renga Kabushiki Kaisha, Tokyo, Japan

[22] Filed: June 12, 1969

[21] Appl. No.: 832,811

[30] Foreign Application Priority Data

June 12, 1968 Japan..................................43/39899

[52] U.S. Cl...............................................106/58, 106/63
[51] Int. Cl.........................................................C04b 35/04
[58] Field of Search........................................106/56, 58, 63

[56] References Cited

UNITED STATES PATENTS 3,070,449  12/1962  Davies et al. ............................106/58
3,236,664  2/1966  Wilson......................................106/63

*Primary Examiner*—James E. Poer
*Attorney*—Sughrue, Rothwell, Mion, Zinn & Macpeak

[57] ABSTRACT

A sintered ceramic body containing residual carbon is prepared by adding to a pitch body containing a special petroleum pitch as a fine powder inorganic powder granules, then kneading, pressure molding, and reduction calcinating the thus molded body. If necessary, a liquid tar fraction other than the special pitch can be added. It is higher in mechanical strength and chemical resistance at a high temperature and is very useful as a refractory.

4 Claims, No Drawings

SINTERED CERAMIC BODY CONTAINING RESIDUAL CARBON, AND PROCESS FOR PREPARING IT

BACKGROUND OF THE INVENTION

The present invention relates to a sintered ceramic body containing residual carbon, the low volatile fractions in pitch being removed by heat treating a molding of pitch bonded powder granules at a high temperature, further modified almost completely to a carbonized configuration by promoting polymerization and dehydrogenation reactions. The invention also relates to a process for preparing such a sintered ceramic body.

Conventional coal pitch and petroleum asphalt are useful for maintaining the form of powder granules during and after molding operations, and have been used in numerous industrial fields. However, when calcinated in a weak oxidation atmosphere at a high temperature most of the carbon disappears after calcination. This is the case even when graphite is previously added. When calcinating in a strong reducing atmosphere, it is difficult to form a ceramic bond. Even if formed, the bond is very weak and hence not useful. Thus it has been considered to be impossible to develop a carbon-powder granule refractory with both a strong carbon bond and ceramic bond.

The necessity of developing this kind of refractory is illustrated below, using a dolomite refractory by way of example.

With an uncalcinated tar dolomite refractory a bond is formed with carbonaceous material. Alternatively, with a calcinated dolomite refractory, the bond is formed with the ceramic material by calcination (ceramic bonded refractory). Both refractories are completely different in their characteristics. In the former refractory, when used for lining steel furnaces, for example a converter, dry distilled pitches are further polymerized and carbonized. The carbon functions to lessen the effects of chemical erosion because it is hard to wet with slags and molten steels. However, the pitch bond suffers from the defect that it is first softened and becomes flowable before it can be carbonized at the operating temperature of the converter, i.e. about 1,600° C, and produce a decarbonized layer within the refractory. In addition, because the mechanical strength is lowered, the former refractory cannot be used as a lining in that place in a converter which might be directly struck at the time of charging steel scraps.

On the other hand, the latter ceramic bonded dolomite refractory is commonly used for lining in places which may be directly struck at the time of charging steel scraps because it is less degraded in strength, even at a high temperature, and has high mechanical shock resistance. However, it is recognized to be more subject to chemical erosion (in comparison with the former).

From the above description, in order to eliminate the defects of both, and to emphasize the characteristics for contributing to the extension of furnace life, it has been strongly desired to develop a dolomite refractory having both strong carbon bonds and ceramic bonds.

The effect of temperature on residual carbon in various pitches has been studied. The results are shown in Table 1.

TABLE 1

| Tar pitches | Residual carbon after retaining in weak reduction atmosphere for 2 hours, % | | |
|---|---|---|---|
| | 1000°C. | 1500°C. | 2000°C. |
| coal pitch, softening point | | | |
| 65°C. | 35 | 3 | Trace |
| 70°C. | 40 | 8 | Trace |
| 72°C. | 55 | 9 | Trace |
| Special petroleum pitch, softening point | | | |
| 70°C. | 60 | 28 | 20 |
| 90°C. | 75 | 47 | 33 |
| 112°C. | 85 | 63 | 48 |
| Straight asphalt, penetration | | | |
| 40 | 15 | none | none |
| 150 | 10 | none | none |
| Blown asphalt, penetration | | | |
| 10 | 25 | Trace | none |

As is apparent from Table 1, special petroleum pitch (which will be later explained in detail) is higher in residual carbon at each temperature in comparison with conventional coal pitches and petroleum asphalts. The special petroleum pitch raw material is prepared as a special aromatic hydrocarbon pitch by heat treating any liquid hydrocarbon (crude oil, heavy fuel oil, light oil, naphtha etc.) at a temperature of above 700° C, preferably 900° to 1,600° C., in practice below 2,300° C., for 0.001 sec. to 0.1 sec. as the first step, and further heat treating the resulting liquid tarry product at a temperature of 150° to 550° C. for more than 1 min., preferably for 5 min. to 5 hours as the second step according to the process of Japanese Pat. application No. 71,920/67.

The reason for the characteristics shown in Table 1 of the special pitch is that the heat treating temperature at the first step is extraordinarily high. This characteristic is further enhanced by the heat treatment of the second step.

However, even when using this kind of pitch, if the optimum method and conditions are not selected in the kneading and molding steps, the invention can not be effectively carried out.

The present inventors have succeeded in obtaining a sintered ceramic body containing residual carbon by adopting the power heat kneading method using the above special pitch in place of the melt kneading method commonly used, which is a method comprising charging the pitch, melted by heating at a temperature above its softening point, together with powder granules previously heated to almost the same temperature to a kneader.

SUMMARY OF THE INVENTION

The present invention relates to a process for preparing a sintered ceramic body containing from 1 to 10 percent of the residual carbon which comprises adding a pitch body containing special petroleum pitch as a fine powder to inorganic powder granules, kneading, pressure molding, and reduction sintering. If necessary, a liquid tar fraction other than the special petroleum pitch may be added thereto. More particularly, 1 to 30 parts of pitch body containing more than 50 percent by weight, of special petroleum pitch as a fine powder is added to 100 parts of inorganic powder granules. If necessary, a liquid tar fraction other than special petroleum pitch is added. The mixture is heat kneaded, and thereafter pressure molded. The molding is then sintered at a temperature of above 1,000° C.

DETAILED DISCLOSURE OF THE PREFERRED EMBODIMENTS

The special petroleum pitch to be used in the present invention should contain substantially more than 50 percent of special petroleum pitch in the pitch body. The special petroleum pitch is obtained by heat treating a liquid hydrocarbon (crude oil, heavy oil, light oil, naphtha etc.) at a temperature of above 700° C. and below 2,300° C, preferably 900° to 1,600° C., for 0.001 sec. to 0.1 sec. as a first step, and further heat treating the resulting tarry product at a temperature of 150° to 550° C. for more than 1 min., preferably for 5 min. to 5 hours as the second step. With less than 50 percent special petroleum pitch, the amount of residual carbon after sintering decreases, and thereby the quality is adversely affected.

As for the amount of pitch body, less than 1 part of pitch body for powder granules is not sufficient to fill up vacant spaces in the compacted structure of the powder granules during pressure molding, and has an unfavorable influence upon the properties of the sintered body. With more than 30 parts pitch body, the molding tends to be easily broken at the softening temperature of pitch, and is deformed and easily cracked. It is important that the powder granules contact each other at their points or faces, and it is desirable that the pitches "fill up" the vacant space surrounded by the particles. Therefore, when using a large amount of pitch, the type of "filling" tends to be such that the pitch interposes at the contact portions between particles, and the molding tends to be easily deformed by softening of the pitches.

In the present invention, a small amount of coal pitch, tar, anthracene oil, or their mixture, can be added to the above special petroleum pitch. By this addition, the workability of the kneading operation can be improved without reducing the quality of special petroleum pitch.

The inorganic powder granules which can be used in the present invention can be a basic refractory material such as, for example, dolomite, magnesia, calcia, chromia, etc. alone or as their mixtures.

In the kneading of the present invention, special petroleum pitch is crushed to a fine powder and added to the powder granules, and the mixture is kneaded under retained heat. The conventional method, such as melt kneading, is not desirable, as explained in the Examples. Also, the molding operation is carried out at or below the kneading temperature. After kneading, molding after reheating by means of a furnace, etc. is not necessary.

Obviously, such conveniences in operation relating to the present invention are economically very advantageous.

The calcination for obtaining a sintered ceramic body containing residual carbon in the present invention is accomplished by heat treating the molded body in a reducing atmosphere at a temperature of above 1,000° C. The dry distillation temperature of the conventional tar dolomite refractory is below 800° C. However, it has been found that, in order to promote the formation of ceramic bond and carbonization in the sintered body of the present invention, reduction calcination at a temperature of above 1,000° C. is required. That is, a novel sintered body containing 1 to 10 percent of residual carbon, in which the carbon bond and the ceramic bond coexist, can be obtained by the above operation.

Thus, according to the present invention, a sintered ceramic body containing residual carbon is obtained by developing a novel carbon-powder granule refractory, which is capable, when calcined, of forming good carbon and ceramic bonds. This has been hitherto considered to be impossible.

The present invention will be illustrated with the following examples:

EXAMPLE 1

Petroleum naphtha was heat treated at 1,300° C. for 0.002 second, and subsequently the resulting tarry product was heat treated at 430° C. for 1 hour to prepare a special petroleum pitch softening at 230° C.

Next, 4 parts of the above petroleum pitch and 100 parts of a mixture of 50 parts, by weight, of dolomite clinker having a particle diameter of 1 to 5 mm and 50 parts, by weight, of magnesia clinker having a particle diameter of below 1 mm as a powder granule were kneaded.

Runs were performed by the conventional melt kneading method which comprises melting the special petroleum pitch by heating it above its softening point and kneading the melted special petroleum pitch with powder granules previously heated at the same temperature. (Test Nos. 1 to 5), and also by the heating powder kneading method of the present invention which comprises adding a special petroleum pitch in the form of powder, in this example below 0.125 mm in particle diameter, to a mixture of powder granules and kneading them. (Test Nos. 6 to 10.)

Next, in the molding operation, the kneaded product was molded to form a cylinder 60 mm in diameter and 60 mm in height by 500 kg/cm² pressure. The molding temperature was lower than the kneading temperature.

In Test Nos. 4 and 6, the kneading product was molded after being heated to above the kneading temperature by a heating furnace.

These samples were heated to 1,000° C. and 1,500° C. at a heating velocity of 2° C./min. in a reduction atmosphere and, after maintaining them at 1,000° C. and 1500° C. for 3 hours, were taken out and their appearances investigated.

The results are as shown in Table 2.

TABLE 2

| Test No. | Kneading Method | Temp. °C. | Molding Temp. °C. | Heat treatment 1000°C. | 1500°C. |
|---|---|---|---|---|---|
| 1. | Melt kneading | 200 | 180 | Soften, deform crack | Soften, deform, crack |
| 2. | " | 180 | 100 | " | " |
| 3. | " | 120 | 100 | " | " |
| 4. | " | 80 | 100 | " | " |
| 5. | " | 80 | 60 | large crack | large crack |
| 6. | Powder heat kneading | 70 | 100 | slight crack | slight crack |
| 7. | " | 70 | 60 | good | good |
| 8. | " | 60 | 50 | " | " |
| 9. | " | 50 | 40 | " | " |
| 10. | " | 40 | 40 | " | " |

As is apparent from Table 2, the lower the kneading temperature and molding temperature, the less the softening, deformation and cracking. The powder heat kneading method of the present invention is therefore more effective. Also, it should be noted that, even if the kneading temperature is lower, when the mixture is molded at higher temperature and then calcinated, cracks and deformation occur. Next, the sintered body obtained according to the present invention was heated as in Test No. 8, at 60° C., and then calcinated at 1,000° C., 1,200° C., 1,400° C. and 1,600° C., respectively, for 3 hours at a heating velocity of 1° C./min. Their physical properties were measured in comparison to a conventional ceramic bond refractory and a tar bond refractory. The results are as shown in Table 3.

TABLE 3

| Material | sintered body of the present invention | | | | Ceramic-bonded refractory | Tar-bonded refractory |
|---|---|---|---|---|---|---|
| Calcination temperature | 1000°C. | 1200°C. | 1400°C. | 1600°C. | | |
| measuring item | | | | | | |
| Apparent porosity (%) | 18.0 | 15.0 | 13.8 | 13.7 | 11.9 | 9.3 |
| Water absorption (%) | 6.5 | 5.2 | 4.2 | 4.1 | 4.0 | 3.3 |
| Apparent specific gravity | 3.40 | 3.39 | 3.38 | 3.39 | 3.41 | 3.40 |
| Bulk density | 2.80 | 2.88 | 2.93 | 2.95 | 3.01 | 2.74 |
| Compressive strength kg/cm² | 420 | 530 | 620 | 610 | 530 | 280 |
| Softening temperature under load, $T_2$°C* | 1710 | 1700 | 1720 | 1730 | 1700 | 1650 |
| Compressive strength at 1500°C., kg/cm² | 70 | 83 | 84 | 98 | 86 | 30 |
| Residual carbon % | 2.8 | 2.7 | 2.4 | 1.8 | none | 300 |

*JIS R 2209

As is apparent from Table 3, the sintered body of the present invention is recognized to be equal or more excellent in compressive strength at room and at high temperature than the conventional tar bonded refractory or ceramic bonded refractory.

What is claimed is:

1. A process for obtaining a sintered body of ceramic containing from 1 to 10 percent residual carbon, and being strongly bonded by carbon and ceramic bonds, comprising:
    forming an admixture consisting essentially of 1 to 30 parts of special petroleum pitch as a fine powder and 100 parts of inorganic powder granules, said special petroleum pitch and said inorganic powder granules being preliminarily heated to substantially the same temperature, which is below the softening point of said special petroleum pitch and is sufficiently high to form a kneadable admixture;

kneading said admixture under heat provided by the retained heat of said preliminarily heated special petroleum pitch and said inorganic powder granles to form a moldable mixture;

pressure molding said moldable mixture after said kneading, said pressure molding being at a temperature no greater than the temperature at which said kneading is conducted, to thereby obtain a pressure molded product; and thereafter reduction calcining said pressure molded product, said special petroleum pitch being obtained by heat treating petroleum hydrocarbons containing crude oil at a temperature of from 700° to 2,300° C for 0.1 to 0.001 seconds to thereby obtain a tarry material and thereafter further heat treating the resulting tarry material at a temperature of from 150° to 550° C. for a period of time of from one minute to 5 hours, said calcining being at a temperature of above 1,000° C.

2. The process of claim 1 wherein said inorganic powder granules are basic refractory materials.

3. The process of claim 2 wherein said basic refractory material is selected from the group consisting of dolomite, magnesia, calcia, chromia and mixtures thereof.

4. The process of claim 3 wherein said basic refractory material is dolomite.

* * * * *